United States Patent Office.

IMPROVEMENT IN LOZENGES.

FREDERICK ERNST, OF NEW YORK.

Letters Patent No. 59,988, dated November 27, 1866.

SPECIFICATION.

TO WHOM IT MAY CONCERN:

Be it known that I, FREDERICK ERNST, of the city, county, and State of New York, have invented a new and improved article of manufacture, to wit, Deodorizing Lozenges; and I hereby declare the following to be a full, clear, and exact description thereof.

The nature of my invention consists in making lozenges which, when chewed or sucked, will destroy all odors emanating from the mouth.

To enable others skilled in the art to make and use my invention, I will proceed to describe the same more particularly.

I take about one-half per cent. permanganate of potash, about one-half per cent. peroxide of barium, about ninety-seven per cent. of sugar, and about two per cent. of gum tragacanth. I mix these ingredients in a finely pulverized state, add some water to it, sufficient to enable me to form a dough. When the dough is formed I divide it in small quantities, and press them in the form required for lozenges, either by a simple press or by a machine used for that purpose. When removed from the press they are dried either in the open air or by means of a slow fire. They are then packed in small packages or boxes, and are ready for use.

These lozenges, when consumed in the usual manner, either by chewing or sucking, will destroy every bad odor arising from the mouth, either from decaying matter adhering to the teeth, or from any other cause whatever.

What I claim as new, and desire to secure by Letters Patent, is—

The deodorizing lozenges as a new article of manufacture, consisting of the ingredients described, for the purpose set forth.

FRED. ERNST.

Witnesses:
    CHS. WEHLE,
    HENRY WEHLE.